United States Patent
Becker et al.

(10) Patent No.: US 9,902,133 B2
(45) Date of Patent: Feb. 27, 2018

(54) MULTI-LAYER FLAT STEEL PRODUCT AND COMPONENT PRODUCED THEREFROM

(71) Applicant: ThyssenKrupp Steel Europe AG, Duisburg (DE)

(72) Inventors: Jens Ulrik Becker, Duisburg (DE); Stefan Myslowicki, Mönchengladbach (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 15/515,657

(22) PCT Filed: Aug. 21, 2015

(86) PCT No.: PCT/EP2015/069277
§ 371 (c)(1),
(2) Date: Mar. 30, 2017

(87) PCT Pub. No.: WO2016/050417
PCT Pub. Date: Apr. 7, 2016

(65) Prior Publication Data
US 2017/0297304 A1 Oct. 19, 2017

(30) Foreign Application Priority Data
Oct. 2, 2014 (DE) .......................... 10 2014 114 365

(51) Int. Cl.
*B32B 15/18* (2006.01)
*B32B 15/01* (2006.01)
(Continued)

(52) U.S. Cl.
CPC ............ *B32B 15/011* (2013.01); *B23K 20/04* (2013.01); *B23K 20/227* (2013.01); *B32B 15/18* (2013.01);
(Continued)

(58) Field of Classification Search
CPC .................................................... B32B 15/011
See application file for complete search history.

(56) References Cited

U.S. PATENT DOCUMENTS

2010/0003540 A1* 1/2010 Koseki .................. B21B 1/38
428/638

FOREIGN PATENT DOCUMENTS

| | | |
|---|---|---|
| DE | 2320186 A | 10/1974 |
| DE | 102005006606 B | 3/2006 |
| DE | 102007022453 A | 11/2008 |
| EP | 2111937 A | 10/2009 |
| EP | 2228459 A | 9/2010 |
| JP | H06256905 A | 9/1994 |

OTHER PUBLICATIONS

Marion Merklein et al: "A review on tailored blanks-Production, applications and evaluation", Journal of Materials Processing Technology, Feb. 1, 2014 Elsevier, NL, vol. 214, Nr:2, pp. 151-164.
(Continued)

*Primary Examiner* — Adam Krupicka
(74) *Attorney, Agent, or Firm* — thyssenkrupp North America, Inc.

(57) ABSTRACT

A multilayer flat steel product may include a multitude of mutually bonded steel alloy layers. A steel of a first steel alloy may be provided in at least one of the steel alloy layers, and a steel of a second steel alloy different than the first steel alloy may be provided in at least one of the other steel alloy layers. The steel of the first steel alloy may have high strength, and the steel of the second steel alloy may have lower strength and lower carbon content. To enable function-optimized modelling of local material properties in all directions, at least one steel of the first steel alloy and at least one steel of the second steel alloy may be present at least within one layer of the flat steel product. Further, a component, such as for a motor vehicle body, may be comprised of a corresponding flat steel product.

15 Claims, 4 Drawing Sheets

(51) Int. Cl.
    *C22C 38/38*     (2006.01)
    *C22C 38/32*     (2006.01)
    *C22C 38/28*     (2006.01)
    *C22C 38/06*     (2006.01)
    *C22C 38/02*     (2006.01)
    *C21D 9/46*     (2006.01)
    *C21D 8/02*     (2006.01)
    *B23K 20/04*     (2006.01)
    *B23K 20/227*     (2006.01)
    *B23K 101/00*     (2006.01)
    *B23K 103/04*     (2006.01)
(52) U.S. Cl.
    CPC .............. *C21D 8/0205* (2013.01); *C21D 9/46* (2013.01); *C22C 38/02* (2013.01); *C22C 38/06* (2013.01); *C22C 38/28* (2013.01); *C22C 38/32* (2013.01); *C22C 38/38* (2013.01); *B23K 2201/006* (2013.01); *B23K 2203/04* (2013.01); *B32B 2605/00* (2013.01)

(56) References Cited

OTHER PUBLICATIONS

ThyssenKrupp Press Release reTriBond® Product, www.thyssenkrupp-steel-europe.com/en/presse/pressrelease.jsp?cid=2778030 (May 27, 2014).
English Translation of International Search Report issued in PCT/EP2015/069277, dated Nov. 4, 2015 (dated Nov. 11, 2015).
English Language Abstract of DE102007022453A.
English Language Abstract of DE2320186A.
Marion Merklein et al: "A review on tailored blanks—Production, applications and evaluation", Journal of Materials Processing Technology, Feb. 1, 2014 Elsevier, NL, vol. 214, Nr:2, pp. 151-164. [[in process of locating copy]].
ThyssenKrupp Press Release reTriBond® Product, www.thyssenkrupp-steel-europe.com/en/presse/pressrelease.jsp?cid=2778030 (May 27, 2014). [[in process of locating copy]].

\* cited by examiner

Fig.2b

MULTI-LAYER FLAT STEEL PRODUCT AND COMPONENT PRODUCED THEREFROM

CROSS REFERENCE TO RELATED APPLICATIONS

This application is a U.S. National Stage Entry of International Patent Application Serial Number PCT/EP2015/069277, filed Aug. 21, 2015, which claims priority to German Patent Application No. DE 10 2014 114 365.5 filed Oct. 2, 2014, the entire contents of both of which are incorporated herein by reference.

FIELD

The present disclosure generally relates to multi-layer flat steel products, including multi-layer flat steel products having mutually bonded steel alloy layers.

BACKGROUND

The term "flat steel product" is understood here to mean steel sheets or steel strips produced by a rolling process and sheet bars and the like that have been divided therefrom.

Requirements in the automobile construction sector are increasing ever further in respect of passenger safety in the event of a crash. At the same time, lightweight construction is an important prerequisite for compliance with the legally stipulated $CO_2$ limits and for the minimization of the energy input required to drive the vehicle. There are likewise ever higher demands in terms of comfort on the part of users of vehicles, which leads to an increased level of electronic components in the vehicle and an increasing vehicle weight as a result. In order to simultaneously fulfill these opposing requirements, the focus has long been on lightweight design in the manufacture of bodywork structures for automobile construction.

For automobile components of relevance in respect of crash safety, components which have become established here are especially those which are produced by hot forming, followed by hardening, of flat steel products consisting of a manganese-boron steel. This manufacturing method, which is also referred to in the field as press-hardening, can produce components which, in spite of optimally low wall thicknesses and associated minimized weight, can be used at locations in a vehicle body that are particularly sensitive in respect of their performance in the event of a crash.

It should be pointed out that the present invention is not restricted solely to automobile construction, but can generally be employed in the industrial sector. In all fields, but specifically in the automotive sector, different demands are made locally on the components with regard to their material properties. Examples of material properties include strength and ductility. "Locally" means that different demands are made on a first section of the component than on a second section. Since these demands can even be opposing, a solution having singular construction materials, i.e. having the same material properties throughout, is at best a compromise of all the individual demands made. It is therefore not only within the context of efforts to achieve lightweight construction in automobile construction that tailored materials are increasingly being used, these enabling optimization of components, for example in terms of their weight via reduction in the sheet thickness, by virtue of locally different material properties. However, the achievement of lightweight construction beyond this level also additionally requires the fulfilment of material properties, some of them contrary, within individual component sections. This means that, for consistent pursuit of lightweight construction, not only are locally different material properties in the sheet plane desirable, i.e. in longitudinal direction (direction of strip length) and in transverse direction (direction of strip width), but also at right angles thereto (direction of sheet thickness).

Longitudinal direction will also be referred to hereinafter as X direction, transverse direction will also be referred to as Y direction, and sheet thickness direction will also be referred to as Z direction.

The prior art discloses, in the mass production of components, the enablement of the establishment of locally different material properties within the sheet plane via methods such as tailored blanks (cold or hot forming) or tailored tempering (hot forming). Function-optimized modelling of material properties in the sheet thickness direction (Z direction) can be achieved through the use of multilayer flat steel products.

A multilayer flat steel product consisting of a multitude of mutually bonded steel alloy layers with at least one core layer is described, for example, by DE 10 2007 022 453 A1. The core layer here is to consist of a soft steel alloy of good formability, whereas the outer layers of the flat steel product are to consist of an ultrahigh-strength steel alloy.

In the press release under the link www.thyssenkrupp-steel-europe.com/en/presse/pressrelease.jsp?cid=2778030 dated 27 May 2014, the applicant publicized a new product named TriBond®—"three layer steel composite for hot forming", which is a multilayer flat steel product having a core layer having a relatively high carbon content and outer layers having a relatively low carbon content. The flat steel product is intended for production of a component for a motor vehicle body, said component being hot-formed and hardened.

BRIEF DESCRIPTION OF THE FIGURES

FIG. 2b is a sectional view of still another example flat steel product.

DETAILED DESCRIPTION

Figure 1A:
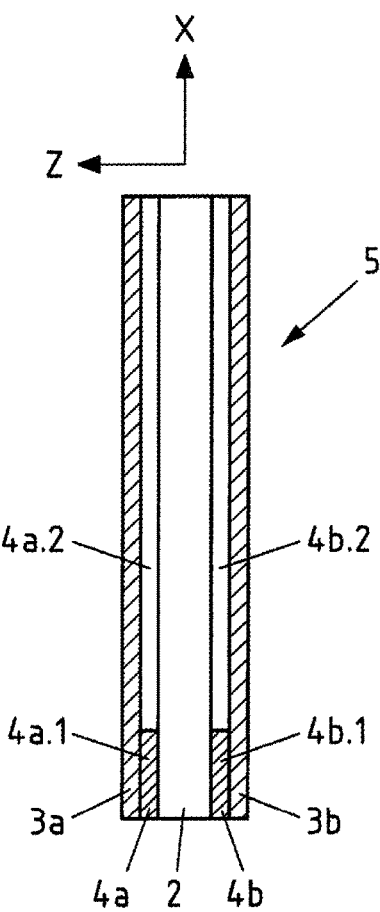
FIG. 1a is a cross-sectional view of an example component.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns multilayer flat steel products that include, at least in some examples, a multitude of mutually bonded steel alloy layers, with a steel of a first steel alloy in at least one of the steel alloy layers and a steel of a second steel alloy different than the first steel alloy in at least one of the other steel alloy layers. The steel of the first steel alloy may be a steel of high strength, and the steel of the second steel alloy may be a steel of lower strength and lower carbon content (than the steel of the first steel alloy). The present disclosure further concerns components made from a corresponding flat steel product, including components for motor vehicle bodies.

Proceeding from the prior art identified above, one example object of the present disclosure is to enable, in a flat steel product, function-optimized modelling of local material properties, especially in all directions (sheet plane, sheet thickness).

The object derived therefrom and indicated is achieved in the case of a multilayer flat steel product (flat steel composite material) consisting of a multitude of mutually bonded steel alloy layers, with provision of a steel of a first steel alloy in at least one of the steel alloy layers and of a steel of a second steel alloy different than the first steel alloy in at least one of the other steel alloy layers, the steel of the first steel alloy being a steel of high strength and the steel of the second steel alloy a steel of low strength and lower carbon content (than the steel of the first steel alloy), in that at least one steel of the first steel alloy and at least one steel of the second steel alloy are provided at least within one layer (sheet plane).

In the simplest case, in the flat steel product of the invention, layers of high-strength steel (i.e. layers of relatively high carbon content) alternate with layers of steel having comparatively lower strength and lower carbon content, especially within individual layers, for example in an interlayer between a core layer and one of the outer layers (top layers) in each case, in which case sections composed of a steel of high strength and a steel of lower strength and lower carbon content alternate with one another. Sections comprising such different steel alloys, i.e. having such different carbon contents, may be arranged directly adjacent to one another in longitudinal direction (X direction) and/or in transverse direction (Y direction) and/or in layer structure direction (Z direction), i.e. may adjoin one another, and/or alternate. By hot forming/press hardening of such a flat steel product, it is possible to produce components having different material properties in different sections, for example with regard to strength and bending angle.

Steels of high strength in the context of the invention are steels made from a steel alloy having a carbon content of at least 0.2% by weight and especially up to 0.65% by weight, which, in the final (hardened) state, have tensile strengths of at least 1200 MPa, especially at least 1350 MPa, preferably at least 1450 MPa. They are defined in DIN EN 10083, for example manganese-boron steels.

According to the invention, in this manner, function-optimized modelling of local material properties in all directions of sheet bars (sheet plane, sheet thickness) is enabled. The material properties established in a material composite are determined to a crucial degree by the choice of the composite partners combined with one another and the proportion and distribution thereof in the direction of the sheet plane and/or sheet thickness. To produce these material composites, slabs, blooms, transfer bars or sheet bars (flat steel products) of the composite partners involved having constant cross section are placed one on top of another and especially bonded to one another by roll cladding. The setting of composite properties which vary in the sheet plane is especially achieved via an inhomogeneous distribution of the composite partners involved.

There now follows a description of various configurations of the flat steel product of the invention, which are also the subject of the dependent claims.

In one configuration of the flat steel product of the invention, the carbon content of the steel of the first steel alloy having high strength, i.e. that which has the higher carbon content, has a value within a range of 0.20%-0.65% by weight, preferably within a range of 0.20%-0.50% by weight, more preferably within a range of 0.20%-0.45% by weight, and/or the carbon content of the steel of the second steel alloy having low strength, i.e. that which has the lower carbon content, has a value within a range below 0.20% by weight, preferably within a range of 0.02%-0.15% by weight, more preferably within a range of 0.02%-0.11% by weight. For example, the carbon content of the steel of the first steel alloy may be 0.22% by weight and the carbon content of the steel of the second steel alloy 0.10% by weight.

In a further configuration of the flat steel product of the invention, it consists of an odd number of steel alloy layers. Preferably, the flat steel product, in accordance with the invention, consists of five steel alloy layers. In the latter case, the flat steel product has a core layer, directly adjoining interlayers on either side, and an outer layer (top layer) adjoining the outside of each interlayer.

Preferably, the flat steel product has a core layer consisting of a steel alloy layer comprising the steel of the first steel alloy having high strength (having the higher carbon content). Further preferably, at least one steel alloy layer consisting of at least one steel alloy layer comprising the steel of the second steel alloy having low strength (having the lower carbon content) is provided on either side of the core layer. For example, the core layer may consist entirely of the first steel alloy having high strength (having the higher carbon content) and/or the outer layers (meaning the two top layers that form the outsides) may consist entirely of the second steel alloy having low strength (having the lower carbon content).

In one interlayer or in both interlayers between the core layer and the respective top layer, it is possible for sections composed of the first steel alloy and sections composed of the second steel alloy to alternate or be arranged alongside one another, specifically in X direction and/or in Y direction and/or in Z direction, although it is also possible in principle for just one and the same steel alloy to be provided entirely in the interlayers.

If such a flat steel product is hardened at a later stage, for example in the course of production of a component, for example a component for a motor vehicle body, the individual sections composed of the different steel alloys will have different material properties, by virtue of individual sections having high strengths and other sections having lower strengths. If a steel having lower strength is used as the second steel alloy, there is also only slight hardening, if any, in this section in the case of press hardening; instead, it is only the sections in the flat steel product that consist of hardenable steel that are hardened.

As elucidated above, it may thus be the case, in a further configuration, that the at least one steel alloy layer comprising the steel of the first steel alloy having high strength, especially the core layer, and/or the at least one steel alloy layer comprising the steel of the second steel alloy having low strength, especially at least one of the outer layers, consists entirely of the same steel. It is further envisaged that the at least one steel alloy layer comprising the steel of the first steel alloy and the at least one steel alloy layer comprising the steel of the second steel alloy will have at least one section composed of a steel of the respective other steel alloy. It is conceivable here that a section composed of a steel of the first steel alloy adjoins a section composed of a steel of the second steel alloy in longitudinal direction and/or in transverse direction and/or in the direction of the layer structure.

In yet a further configuration of the flat steel product of the invention, it is envisaged that the core layer will account for 30%-90%, especially 50%-80%, of the thickness of the flat steel product. In the case of a hot-formed/press-hardened component produced from a flat steel product of the invention too, it is preferable when the core layer accounts for 30%-90%, especially 50%-80%, of the total thickness of the steel sheet of the component. The thickness ratio of top layer to core layer may be determined as a function of the property of the flat steel product of the invention which is to be prioritized. The core layer is preferably thicker in principle than any one of the other layers. For example, the core layer in the case of a five-layer structure accounts for 50% and each of the four other layers each for 12.5% of the total thickness of the flat steel product or steel sheet of the component. A corresponding flat steel product is suitable, for example, as a semifinished product for a main body beam in automobile construction. The thickness of the core layer may even be chosen at a higher level and may account, for example, for 70% of the total thickness of the flat steel product or steel sheet of the component, in which case the other four layers each account, for example, for 7.5% of the total thickness. A corresponding flat steel product can be used, for example, as a semifinished product for B pillars in automobile construction.

In a further configuration of the flat steel product of the invention, all steel alloy layers are cohesively bonded to the respective adjacent steel alloy layer(s) by hot rolling or hot cladding.

A steel usable in practice for the core layer in particular, i.e. the steel for the first steel alloy, aside from iron and unavoidable impurities from the production, typically consists of (in % by weight)
- C: 0.2%-0.5%, especially 0.2%-0.45%,
- Si: 0.15%-0.8%, especially 0.2%-0.6%,
- Mn: 1.0%-1.9%, especially 1.15%-1.7%,
- Al: 0.002%-0.05%, especially 0.01%-0.04%,
- Cr: 0.01%-0.5%, especially 0.02%-0.4%,
- Ti: 0.01%-0.5%, especially 0.02%-0.3%,
- B: 0.0002%-0.05%, especially 0.001%-0.02%.

The impurities include: P: up to 0.030, S: up to 0.030, Cu: up to 0.10, Mo: up to 0.050, N: up to 0.020, Ni: up to 0.10, Nb: up to 0.20, V: up to 0.010, Sn: up to 0.030, Ca: up to 0.01%.

One of the outer layers or both outer layers or one or both interlayers of a flat steel product of the invention, i.e. the steel of the second steel alloy, by contrast, typically consist(s) of a steel which, aside from iron and unavoidable impurities from the production, contains (in % by weight),
- C: up to 0.15%, especially 0.02%-0.11%,
- Si: up to 0.7%, especially 0.01%-0.6%,
- Mn: 0.10%-1.9%, especially 0.13%-1.8%,
- Al: up to 0.6%, especially 0.001%-0.2%,
- Cr: up to 0.6%, especially 0.025%-0.5%,
- Nb: up to 0.5%, especially 0.002%-0.2%,
- Ti: up to 0.5%, especially 0.02%-0.3%.

The impurities include: P: up to 0.25%, S: up to 0.15%, Cu: up to 0.15%, Mo: up to 0.05%, N: up to 0.06%, Ni: up to 0.15%, V: up to 0.02%, B: up to 0.01%, Sn: up to 0.04% and Ca: up to 0.03%.

The object is also achieved by a component, especially for a motor vehicle body, produced by hot forming/press hardening of a flat steel product as defined above. In hot forming/press hardening, at least the steel having the relatively high carbon content (i.e. the steel of the first steel alloy) is hardened and receives its high strength (in the final state), for example a tensile strength of at least 1200 MPa, especially at least 1350 MPa, preferably at least 1450 MPa. Such a component may, for example, be a body main beam or a B pillar of a motor vehicle.

The core of the present invention is thus a preferably at least five-layer steel material composite especially comprising a core layer consisting of a hardenable steel material. According to the design of the component to be produced, and taking account of the radial and/or axial forces to be absorbed in the event of a crash, stacks of sheets/slabs are assembled as required and hot-rolled, if appropriate cold-rolled, to a required (final) thickness, annealed and/or surface finished. By a combination of steel materials having high and low strengths, especially having different carbon contents, it is possible to provide components having locally different strengths and bending angles, which can be produced in a conventional hot forming line, meaning that the semifinished products are fully austenitized and hot-formed and/or press-hardened in cooled tools. Additional annealing may follow the (press-)hardening. By virtue of the material combination in the semifinished product, it is possible to establish regions having different properties in a controlled manner without having to conduct tailored tempering before, during or after the hot forming.

There is thus a multitude of ways of configuring and further developing the multilayer flat steel products and components of the present disclosure.

FIG. 1a) shows a schematic cross-sectional view of a component 5 for a motor vehicle body, for example a B pillar, produced by hot forming/press hardening of a corresponding flat steel product 1. Examples of flat steel products 1 are shown in FIGS. 1c) and d), and 2.

Figure 1B:
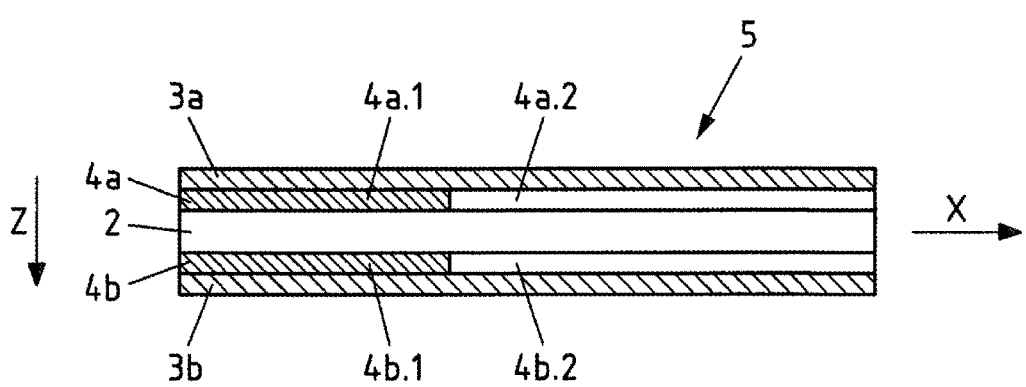
FIG. 1b is a cross-sectional view of another example component.
Figure 1C:
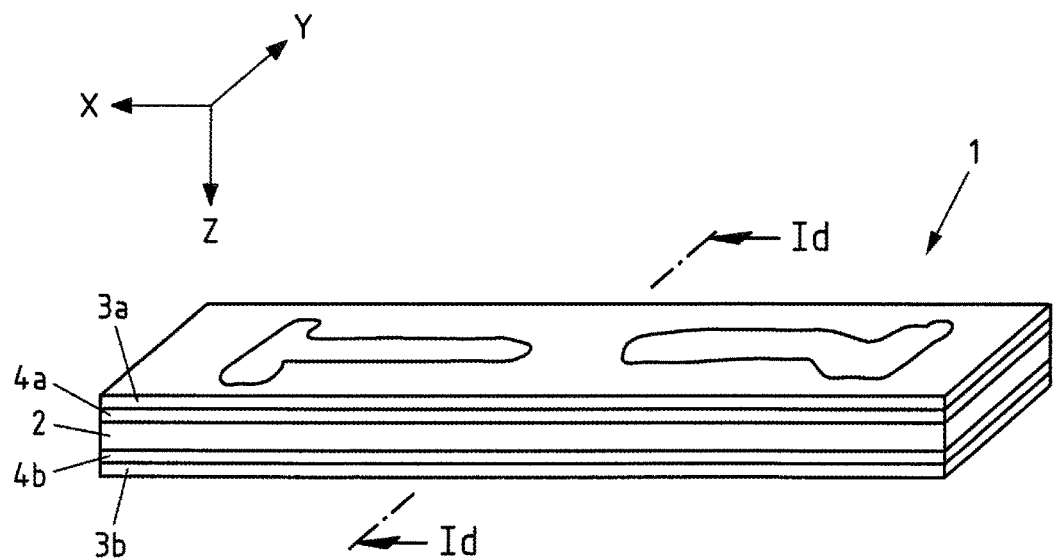
FIG. 1c is a perspective view of an example flat steel product.

FIG. 1b) shows a schematic of another component 5 for a motor vehicle body, for example a main vehicle beam. This component 5 has likewise been produced from an inventive flat steel product 1 in the manner described.

The component 5 and the underlying flat steel product 1 consist of a multitude of mutually bonded steel alloy layers: a core layer 2, two outer top layers 3a and 3b, and interlayers 4a and 4b that are arranged between each of the top layers 3a and 3b and the core layer 2. The component 5 here thus has a five-layer structure.

The core layer 2 here consists of a hardenable steel having high strength (in the final state) having a relatively high carbon content, whereas the outer layers 3a and 3b do not consist of a hardenable steel or consist of an only slightly hardenable steel having lower strength, having a lower carbon content than the core layer 2. The interlayers 4a and 4b respectively have both a section 4a.1 and 4b.1 composed of a steel having a relatively low carbon content and a section 4a.2 and 4b.2 composed of a steel having a relatively high carbon content. In the core layer 2 and in the sections 4a.2 and 4b.2 of the interlayers 4a and 4b, the carbon content has a value within a range of, for example, 0.20% to 0.65% by weight and is especially 0.22% by weight. In the outer layers 3a and 3b and in the sections 4a.1 and 4b.1 of the interlayers 4a and 4b, the carbon content has, for example, a value within a range of less than 0.20% by weight and is especially less than 0.15% by weight.

In the component 5 in FIG. 1a), it is apparent that, in the lower region, only the core layer 2 consists of a hardenable steel having a high carbon content, whereas the other layers 3a, 3b, 4a and 4b in the lower region consist of another steel having lower strength and lower carbon content. The same applies to the left-hand region of the component 5 in FIG. 1b). The remaining region of the respective component 5 (upper region of component 5 in FIG. 1a) and right-hand region of the component 5 in FIG. 1b)) is constructed here in such a way that both the core layer 2 and the interlayers 4a and 4b consist of hardenable steel having a relatively high carbon content, whereas only the outer layers 3a and 3b consist of a steel having lower strength and a lower carbon content.

It is also apparent that, in the component 5 in FIG. 1a), the core layer 2 is thicker than in the case of the component 5 in FIG. 1b). The thickness ratio in FIG. 1a) (from the outer layer on the left to the outer layer on the right) is, for example, 10:10:60:10:10. The thickness ratio in FIG. 1b) is, for example, (from the upper outer layer to the lower outer layer) 12.5:12.5:50:12.5:12.5.

In the two working examples, the layer thicknesses of the two outer layers 3a and 3b are identical. The layer thicknesses of the two interlayers 4a and 4b are also identical here. More particularly, the layer thicknesses of the outer layers 3a and 3b are identical to the layer thicknesses of the interlayers 4a and 4b. The statements made above with regard to the layer thicknesses of the respective component 5 apply equally in accordance with the invention to the layer thicknesses of the underlying multilayer flat steel product 1. Here too, it is possible for the outer layers 3a and 3b and/or interlayers 4a and 4b to be of equal thickness and especially to be thinner than the core layer 2.

Figure 1D:
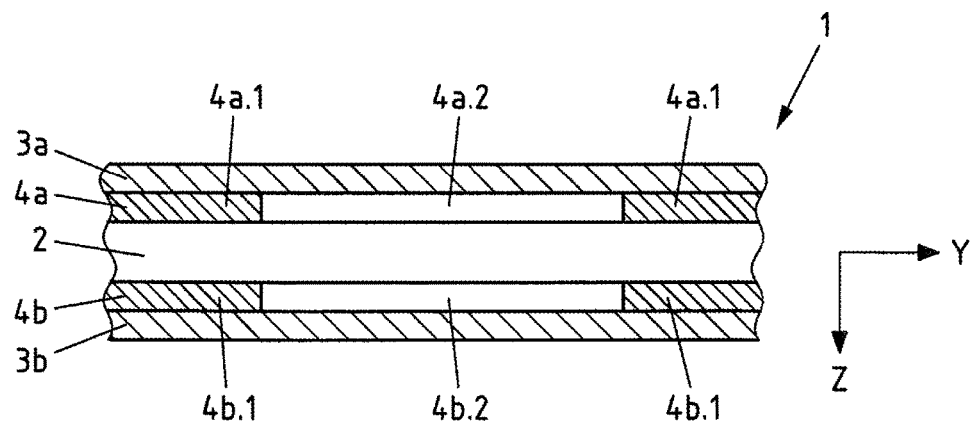
FIG. 1d is a cross-sectional view of an example flat steel product.

FIG. 1c) shows a schematic of a flat steel product 1 in perspective view. FIG. 1d) shows a schematic of a section of component 1 along the section line Id-Id shown in FIG. 1c) (the view in FIG. 1d) is thus in rolling direction or in X direction).

In the flat steel product 1 in FIGS. 1c) and 1d), it is apparent that, in the transverse direction Y too, a section 4a.1 composed of a steel of a first steel alloy having high strength (in the final state) adjoins a section 4a.2 of a steel of a second steel alloy having lower strength and the latter in turn adjoins another section 4a.1 composed of a steel of the first steel alloy. The same also applies mutatis mutandis to the respective other interlayer 4b.

In FIG. 1c), it is also apparent that, in the upper layer 3a too, in regions that are unsymmetric here by way of example, sections composed of different steel alloys may be provided. These symmetric or unsymmetric sections may also be provided in one or more other layers, for example in the lower layer 3b.

Figure 2A:
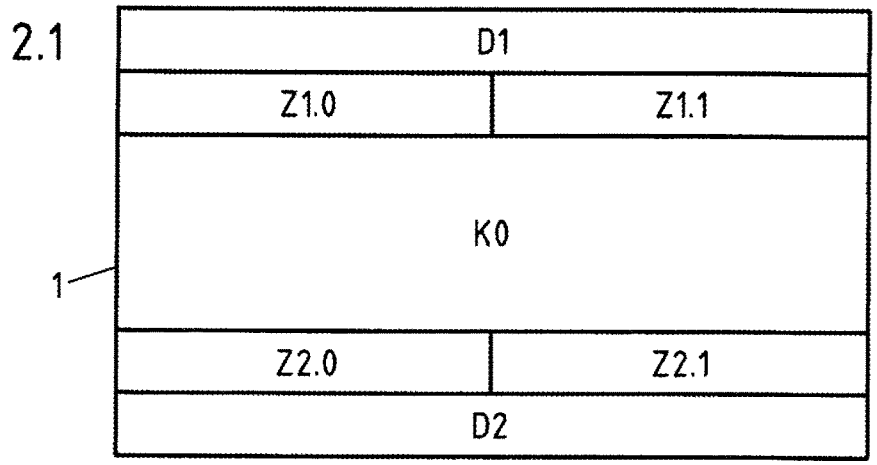
FIG. 2a is a sectional view of another example flat steel product.
Figure 2A:
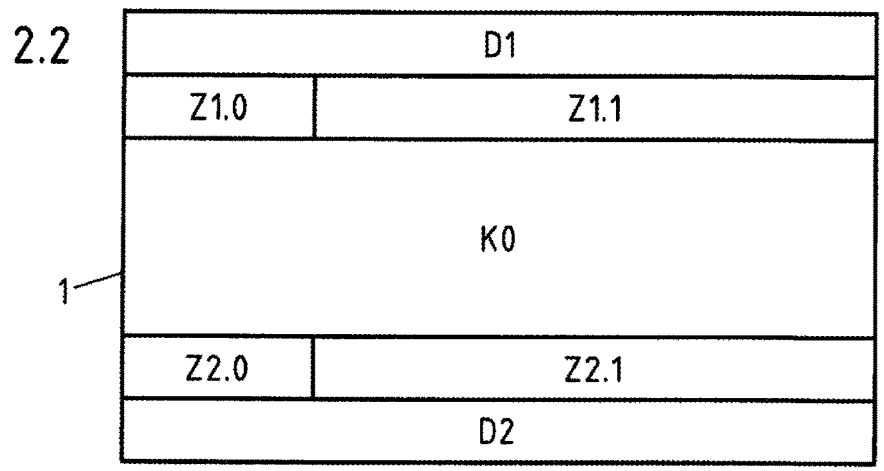
Figure 2A:
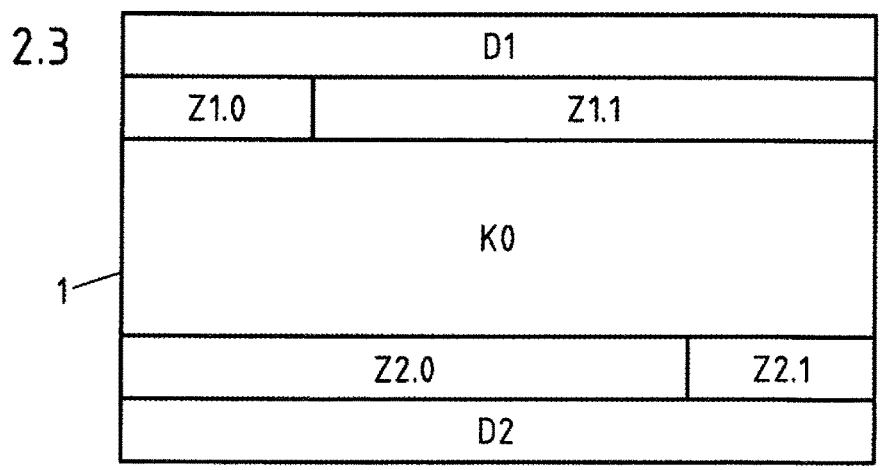
Figure 2B:
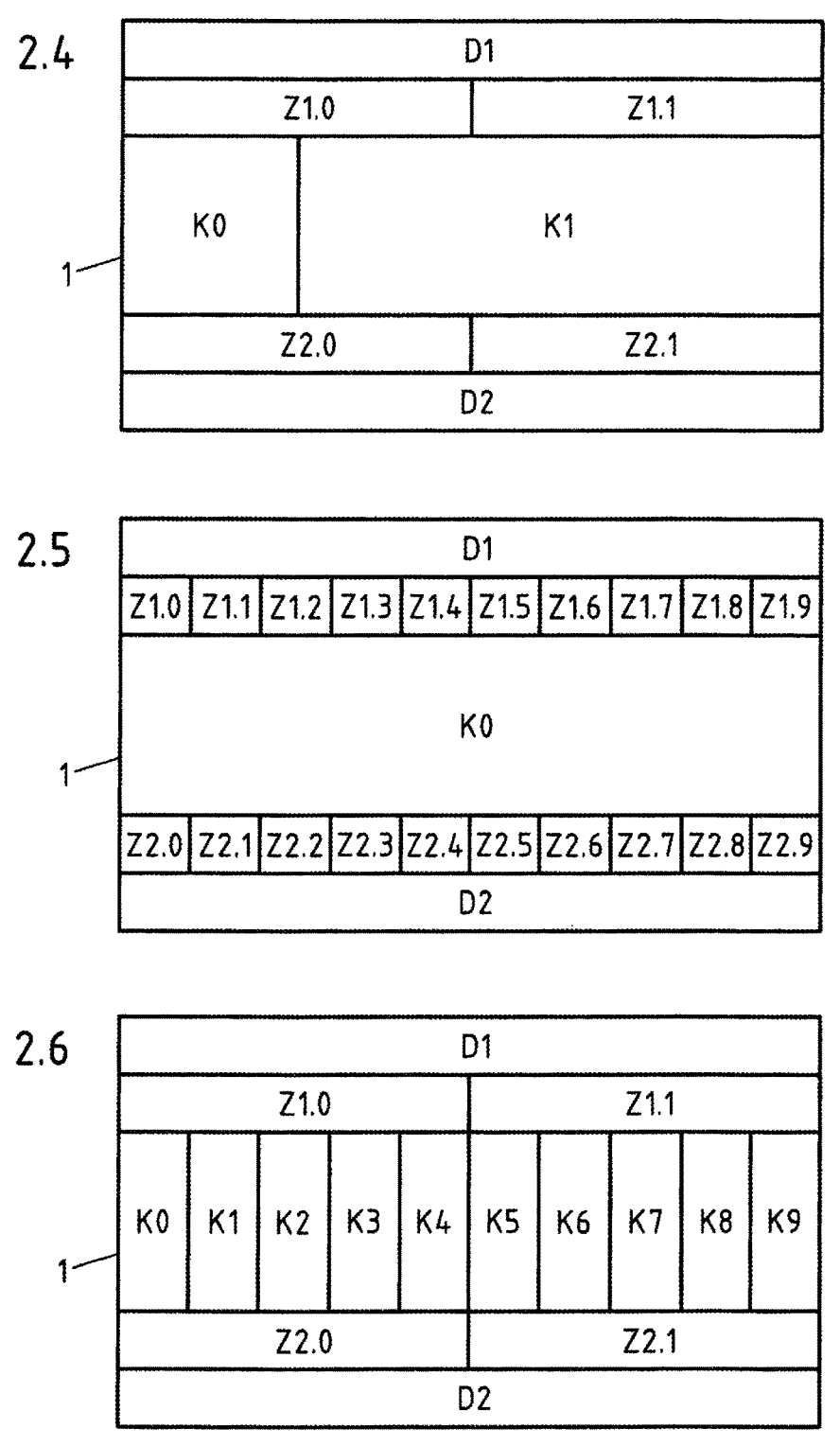

Finally, FIG. 2 shows, in schematic form, further variants of a flat steel product 1, it being apparent that both the core layer and each interlayer may each consist of sections of different steel alloys. In this case, some of the sections comprise a hardenable steel having a relatively high carbon content, whereas other sections comprise a steel having a relatively low carbon content. The individual sections of the core layer are identified by "K0 . . . K9", and the various sections of the interlayers by "Z1.0 . . . Z1.9" and "Z2.0 . . . Z2.9". The top layers are identified here by "D1" and "D2" and always consist entirely of the same steel alloy.

What is claimed is:

1. A multilayer flat steel product comprising mutually-bonded steel alloy layers, wherein a steel of a first steel alloy is present at least in one of the steel alloy layers, wherein a steel of a second steel alloy different than the first steel alloy is present at least in another of the steel alloy layers, wherein the steel of the first steel alloy is of high strength and the steel of the second steel alloy is of lower strength and lower carbon content, wherein at least one steel of the first steel alloy and at least one steel of the second steel alloy are both present in at least one of the steel alloy layers.

2. The multilayer flat steel product of claim 1 wherein at least one of
 a carbon content of the steel of the first steel alloy has a value within a range of 0.20%-0.65% by weight, or
 a carbon content of the steel of the second steel alloy has a value of less than 0.20% by weight.

3. The multilayer flat steel product of claim 1 consisting of an odd number of steel alloy layers.

4. The multilayer flat steel product of claim 1 comprising a core layer consisting of a steel alloy layer comprising the steel of the first steel alloy.

5. The multilayer flat steel product of claim 4 wherein at least one steel alloy layer is disposed on either side of the core layer and consists of at least one steel alloy layer comprising the steel of the second steel alloy.

6. The multilayer flat steel product of claim 4 wherein the core layer accounts for 30-90% of a thickness of the flat steel product.

7. The multilayer flat steel product of claim 1 wherein the at least one steel alloy layer comprising the steel of the first steel alloy and/or the at least one steel alloy layer comprising the steel of the second steel alloy consist(s) entirely of the same steel.

8. The multilayer flat steel product of claim 1 wherein the at least one steel alloy layer comprising the steel of the first steel alloy and/or the at least one steel alloy layer comprising the steel of the second steel alloy has at least one section composed of a steel of the respective other steel alloy.

9. The multilayer flat steel product of claim 8 wherein a section composed of the steel of the first steel alloy adjoins a section composed of the steel of the second steel alloy in a longitudinal direction and/or in a transverse direction and/or in a sheet thickness direction.

10. The multilayer flat steel product of claim 1 wherein all of the steel alloy layers are cohesively bonded to one another by hot rolling.

11. The multilayer flat steel product of claim 1 wherein the first steel alloy consists of a steel, which aside from iron and unavoidable impurities from production contains:
 0.2%-0.5% by weight C;
 0.15%-0.8% by weight Si;
 1.0%-1.9% by weight Mn;
 0.002%-0.05% by weight Al;
 0.01%-0.5% by weight Cr;
 0.0020%-0.5% by weight Ti; and
 0.0002%-0.05% by weight B.

12. The multilayer flat steel product of claim 11 wherein a core layer consists of a steel, which aside from iron and unavoidable impurities from production contains:
 0.2%-0.45% by weight C;
 0.3%-0.6% by weight Si;
 1.1%-1.5% by weight Mn;
 0.001%-0.04% by weight Al;
 0.01%-0.45% by weight Cr;
 0.002%-0.2% by weight Ti; and
 0.002%-0.01% by weight B.

13. The multilayer flat steel product of claim 1 wherein the second steel alloy consists of a steel, which aside from iron and unavoidable impurities from production contains:
 up to 0.15% by weight C;
 up to 0.7% by weight Si;
 0.10%-1.9% by weight Mn;

up to 0.6% by weight Al;
up to 0.6% by weight Cr;
up to 0.5% by weight Nb; and
up to 0.5% by weight Ti.

14. The multilayer flat steel product of claim 13 comprising two outer layers, wherein at least one of the two outer layers consists of a steel, which aside from iron and unavoidable impurities from production contains:
0.02%-0.11% by weight C;
0.01%-0.6% by weight Si;
0.13%-1.8% by weight Mn;
0.001%-0.2% by weight Al;
0.025%-0.5% by weight Cr;
0.002%-0.2% by weight Nb; and
0.02%-0.3% by weight Ti.

15. A component for a motor vehicle body produced by hot forming or press hardening a multilayer flat steel product that comprises mutually-bonded steel alloy layers, wherein a steel of a first steel alloy is present at least in one of the steel alloy layers, wherein a steel of a second steel alloy different than the first steel alloy is present at least in another of the steel alloy layers, wherein the steel of the first steel alloy is of high strength and the steel of the second steel alloy is of lower strength and lower carbon content, wherein at least one steel of the first steel alloy and at least one steel of the second steel alloy are both present in at least one of the steel alloy layers.

\* \* \* \* \*